UNITED STATES PATENT OFFICE.

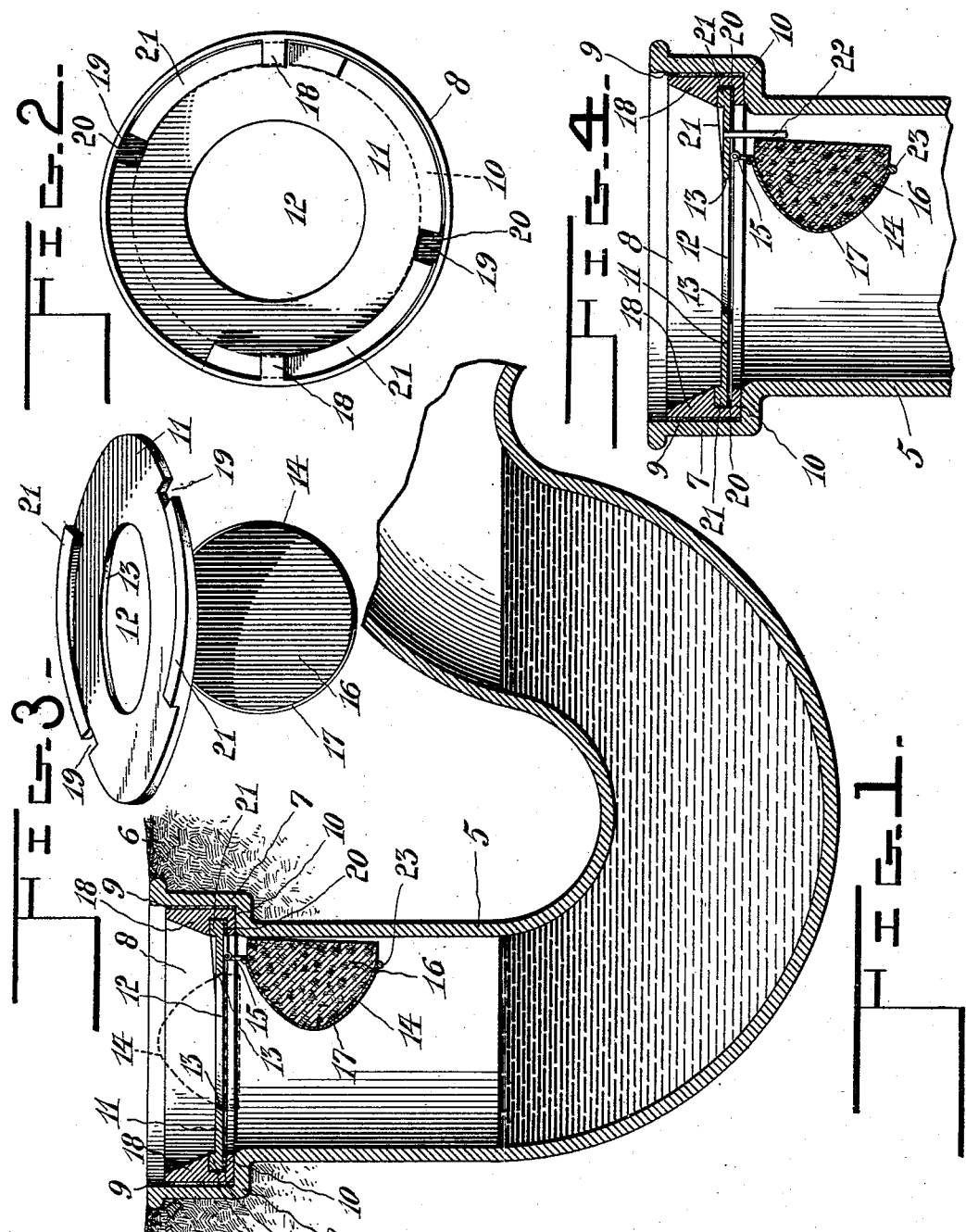

BENJAMIN MÉNARD, OF FARNHAM, CANADA.

TRAP-VALVE.

SPECIFICATION forming part of Letters Patent No. 714,006, dated November 18, 1902.

Application filed February 3, 1902. Serial No. 92,308. (No model.)

*To all whom it may concern:*

Be it known that I, BENJAMIN MÉNARD, a subject of His Majesty the King of Great Britain, residing at Farnham, county of Missiquoi, Province of Quebec, Canada, have invented certain new and useful Improvements in Trap-Valves; and I do hereby declare that the following is a full, clear, and exact description of the invention, such as will enable others skilled in the art to which it appertains to make and use the same.

The subject of this invention is an automatic check-valve adapted for use in the mouth or openings of traps, and this valve is especially suited to traps in sinks or cellars at low elevations above the sewer-pipe and in those situations in which the sewer is apt to become flooded, so as to cause a backflow of sewage into the cellar or other place with which the trap is connected, and this valve is adapted to prevent such backflow through the trap or waste-pipe by closing whenever the trap tends to overflow at its inlet end, while at all other times it will remain open to allow the passage of water, although it will be understood that my apparatus is also adaptable for other purposes and uses, as the occasion may arise.

The object of this invention is to produce such a valve which will close perfectly tight and absolutely prevent leakage of the sewage-water back into the cellar or past the trap, while an additional advantage is gained by my construction in the readiness with which the valve and its seat may be entirely removed from the opening of the trap to facilitate cleaning.

Another object of my invention is to produce such a valve at a reduced cost of manufacture which shall perfectly serve the purpose for which it is employed.

My invention consists in the peculiar construction and combination, which is set forth in the following description, and particularly pointed out in the claims.

I have shown the preferred form of my valve in the accompanying drawings, wherein—

Figure 1 is a vertical central section through a trap having my improved valve attached thereto. Fig. 2 is a plan view of the valve box and seat, the valve-plug itself being removed. Fig. 3 is a perspective view of the valve-plate, showing the plug in open position; and Fig. 4 is a central vertical section of a trap, showing a slightly-modified form of valve.

The same numerals of reference denote like parts in all the figures of the drawings.

5 is the sewer-trap, of any ordinary pattern, which, as shown, is set in the floor of a sink or cellar 6 and embedded therein. The trap has an open mouth or bell 7, which serves as a seat or abutment for the valve-box 8, which is cylindrical in exterior form to correspond with the size of the bell, the small interval between the exterior of the box 8 and the bell 7 being filled with cement or solder 9, which perfectly seals the joint and holds the valve in position. This valve-box 8 is formed with an inwardly-extending annular flange 10 around its lower side, on which rests the valve-plate 11, having a central aperture 12, the edges of which are beveled, as shown at 13, to form a seat for the valve-plug 14, which latter is hinged to the plate 11 by a hinge connection 15.

The valve-plug 14 is formed of cork 16 or other equivalent light material adapted to be raised and to float upon the liquid in case it rises in the open end of the trap, and this cork body 16 is covered by an oval or spheroidal metallic cover 17, which protects the cork from wear and forms a tight joint against the seat 13. This plug 16 is permanently fastened to the plate 11 by the hinge 15; but both are removable from the box 8, the latter being formed interiorly of the same diameter as the exterior edge of the plate 11; but it has two projecting downwardly-facing snugs 18, formed on opposite sides, and the plate 11 has two corresponding recesses 19 to permit of it being pressed down over the snugs 18, when it may be turned around, and thus locked in place. In order to make a firm and water-tight joint between the plate and box, a gasket 20, of rubber or like material, is placed between the flange 10 and the plate 11, and the latter has a pair of oblique-faced ribs 21 extending marginally thereof and having the narrow end adjacent each to one of the holes 19 in the plate, the object of this construction being that when the plate 11 is placed on the bottom of the box 8 and turned to lock it the snugs 18 engage the oblique ribs 21 and force the plate down against the gasket 20, whereby the plate is securely locked and water is prevented from escaping through the joint thus formed. The plate and plug may then be readily removed simply by rotating them in reverse direction.

Under ordinary circumstances the valve-plug will be of sufficient size and will project sufficiently below the hinge 15 so that it will abut against the interior side of the trap below the bell 7, and this will retain it from passing too far, so that its center of buoyancy will always remain on the left of the hinge; but in case of the use of a small valve-plug I may provide a pin 22, (see Fig. 4,) which projects downwardly from the lower face of the valve-plate and in such a position as to prevent the valve-plug 14 from swinging too far back, in which case the water would not close it, but would only hold it in open position.

It will be seen that under ordinary circumstances the valve will remain open by gravity to allow the passage of liquid into the pipe; but on any tendency to flood the water rising in the open end of the trap will immediately raise the plug into closed position by reason of its buoyancy, and the greater the pressure of the water the tighter will the joint be. I have found this valve to be very effectual in that it absolutely seals the pipe without possibility of the escape of any water, and this is done with a maximum of simplicity.

The upper side of the valve-plug 14 is given the spheroidal or subconical form shown in order to keep it clean and prevent any accumulation of dirt on its upper side, and a small flange or bead 23 may be preferably formed on the margin of the cap to form a closure after the opening 12 has been reamed out to take up wear.

While I have shown in the accompanying drawings the preferred form of my invention, it will be understood that I do not limit myself to the precise form shown, for many of the details may be changed in form or position without affecting the operativeness or utility of my invention, and I therefore reserve the right to make such modifications as are included in the scope of the following claims.

Having thus described my invention, what I claim as new, and desire to secure by Letters Patent, is—

1. A check-valve comprising a body portion having a seat and a hinged plug adapted to close the seat formed of solid non-metallic buoyant material such as cork and having a metallic cap of spheroidal form covering said material and fitting into said seat.

2. A check-valve for drain-pipes comprising a cylindrical body, a removable plate having an aperture therein forming a valve-seat, and a valve-plug hinged thereto and adapted to close said aperture, said plug being formed of solid non-metallic buoyant material such as cork covered by a metallic cap.

3. A check-valve for drain-pipes comprising a cylindrical body having an interior annular flange extending inwardly thereof and adapted to be seated in the bell of a drain-pipe, one or more snugs formed on the inner side of said body, a valve-plate having a notch or recess in the side adapted to pass over said snug and an oblique cam-face adapted to be engaged by said snug whereby to depress the plate upon the annular flange, and a buoyant valve-plug adapted to be seated in an aperture in said plate.

4. A check-valve for drain-pipes comprising a cylindrical body having an interior annular flange extending inwardly thereof and adapted to be seated in the bell of a drain-pipe, one or more snugs formed on the inner side of said body, a valve-plate having a notch or recess in the side adapted to pass over said snug and an oblique cam-face adapted to be engaged by said snug whereby to depress the plate upon the annular flange, and a buoyant valve-plug hinged to the plate at one side thereof on its lower side and adapted to be seated in an aperture of said plate to remain normally open by gravity and to be closed by the rise of water in the pipe.

5. A check-valve for drain-pipes comprising a cylindrical body having an interior annular flange extending inwardly thereof and adapted to be seated in the bell of a drain-pipe, one or more snugs formed on the inner side of said body, a valve-plate having a notch or recess in the side adapted to pass over said snug and an oblique face adapted to be engaged by said snug whereby to depress the plate upon the annular flange, a valve-plug having a cork body covered by a spheroidal metallic cap and attached to the plate by a hinge at the lower side thereof, said metallic cap being adapted to be seated against a central aperture having beveled sides formed in the valve-plate, and a pin or stop projecting from the lower side of the valve-plate to form an abutment for the plug and prevent it from swinging too far back, substantially as described.

6. A check-valve for drain-pipes comprising an annular body of L-shaped cross-section having a vertical and a horizontal limb adapted to lie flat against the interior of the bell-mouth of a pipe, a valve-plate having a central aperture therein removably fixed within said body, and a buoyant valve hinged to the lower side of said plate.

7. A check-valve for drain-pipes comprising an annular body of L-shaped cross-section having a vertical and a horizontal limb adapted to lie flat against the interior of the bell-mouth of a pipe, a flat plain disk-shaped valve-plate having a central aperture therein and removably seated within said body, and a buoyant valve hinged to the lower side of said plate.

8. A check-valve for drain-pipes comprising an annular body of L-shaped cross-section having a vertical and a horizontal limb adapted to lie flat against the interior of the bell-mouth of a pipe, a flat plain disk-shaped valve-plate having a central aperture therein and removably seated within said body, a buoyant valve hinged to the lower side of said plate, a pair of projecting snugs on the interior of said valve-body, a pair of corresponding notches formed in said valve-plate, and a pair of oblique inclined planes around the margin of said valve-plate extending upwardly from said notches and adapted to engage the under edges of said snugs to depress said plate.

9. A check-valve for drain-pipes comprising an annular body of L-shaped cross-section having a vertical and a horizontal limb adapted to lie flat against the interior of the bell-mouth of a pipe, a flat plain disk-shaped valve-plate having a central aperture therein and removably seated within said body, a buoyant valve hinged to the lower side of said plate, a pair of projecting snugs on the interior of said valve-body, a pair of corresponding notches formed in said valve-plate, a pair of oblique inclined planes around the margin of said valve-plate extending upwardly from said notches and adapted to engage the under edges of said snugs to depress said plate, and a gasket of resilient material interposed between said valve-plate and said valve-body.

In witness whereof I have hereunto set my hand in the presence of two witnesses.

BENJAMIN MÉNARD.

Witnesses:
E. AUDETTE,
H. A. SNIDU.